United States Patent [19]

Abe et al.

[11] Patent Number: 4,578,748

[45] Date of Patent: Mar. 25, 1986

[54] POSITIONING CONTROL SYSTEM

[75] Inventors: Riichi Abe; Katsuji Tsuruta, both of Hiratsuka; Seiji Tsujikado, Sagamihara, all of Japan

[73] Assignee: Kabushiki Kaisha Komatsu Seisakusho, Tokyo, Japan

[21] Appl. No.: 427,926

[22] Filed: Sep. 29, 1982

[30] Foreign Application Priority Data

Oct. 26, 1981 [JP] Japan .................. 56-171063
Dec. 23, 1981 [JP] Japan .................. 56-208850

[51] Int. Cl.⁴ ................................. G05B 11/18
[52] U.S. Cl. .................... 364/167; 364/182; 318/603; 318/626; 318/632
[58] Field of Search ............ 364/167, 170, 176, 182, 364/183, 513; 318/592, 594, 603, 626, 632, 282, 593; 377/17, 18

[56] References Cited

U.S. PATENT DOCUMENTS

| | | | |
|---|---|---|---|
| 3,093,781 | 6/1963 | Anke et al. | 364/183 X |
| 3,724,720 | 4/1973 | Bullivant | 364/183 X |
| 4,112,291 | 9/1978 | Fukuyama et al. | 318/603 X |
| 4,225,928 | 9/1980 | Ohkubo | 364/182 |
| 4,310,787 | 1/1982 | Seeger et al. | 318/608 X |
| 4,312,033 | 1/1982 | Sweeney et al. | 364/167 |
| 4,323,832 | 4/1982 | Okamura | 364/167 X |
| 4,330,832 | 5/1982 | Kohzai et al. | 318/571 X |
| 4,338,672 | 7/1982 | Perzley et al. | 364/193 |
| 4,345,192 | 8/1982 | Kohzai et al. | 318/592 |
| 4,347,470 | 8/1982 | Kohzai et al. | 318/594 |
| 4,348,622 | 9/1982 | Inoue | 318/314 X |
| 4,371,942 | 2/1983 | Damikolas | 364/170 X |
| 4,396,987 | 8/1983 | Inaba et al. | 364/513 |
| 4,398,138 | 8/1983 | Kohzai et al. | 318/561 X |
| 4,401,930 | 8/1983 | Kato et al. | 364/142 X |
| 4,408,286 | 10/1983 | Kikuchi et al. | 364/191 X |
| 4,410,951 | 10/1983 | Nakamura et al. | 364/167 |
| 4,439,825 | 3/1984 | Donner | 364/167 |

*Primary Examiner*—Jerry Smith
*Assistant Examiner*—Allen MacDonald
*Attorney, Agent, or Firm*—Spensley Horn Jubas & Lubitz

[57] ABSTRACT

A positioning control system wherein variations in the robot coasting distance are substantially eliminated by stopping the command pulse signals simultaneously with a generation of the origin pulse signal from the incremental encoder. The deviation between the final robot position and the origin is minimized by driving the motor in its backward direction to back up the robot by an amount approximately equal to the coasting distance. The robot moving distance during the time period from the beginning of origin return operation (i.e., backup) to a generation of the first spike in the origin pulse signal after beginning backup to the above first stoppage of the robot is found. If the found distance is different from the coasting distance then this difference is handled as an error.

In one aspect of the present invention, the number of spikes appearing in the output pulse signal from the incremental encoder can be easily increased as necessary to thereby improve the resolution power of the incremental encoder. Further, much more precise positioning control can be realized by synchronizing the output pulse signal of the incremental encoder with the clock signal of the microcomputer.

5 Claims, 10 Drawing Figures (a) ORIGIN DETECTION SIGNAL LS (b) DATA X (c) ROBOT SPEED (MOTOR SPEED)

(d) ORIGIN PULSE SIGNAL BP (a) ORIGIN DETECTION SIGNAL LS (b) DATA X (c) ROBOT SPEED (MOTOR SPEED)

(d) ORIGIN PULSE SIGNAL BP

POSITIONING CONTROL SYSTEM

BACKGROUND OF THE INVENTION

The present invention relates to a positioning control system which can be applied to various types of industrial robots or numerical control (NC) machine tools.

First, explanation will be made about a prior-art positioning control system with reference to FIG. 1. There is shown a block diagram of the prior art in FIG. 1 wherein a microcomputer 1 supplies data X indicative of movement amount of a robot (not shown) to a pulse distributor 2 whereby the robot is positioned. More specifically, a data request signal DR is sent cyclically from the pulse distributor 2 to the micro computer 1 so that each time the micro computer 1 receives the data request signal DR the micro computer 1 sends the data X to the pulse distributor 2. This causes the pulse distributor 2 to send to a deviation counter 3 a command pulse signal CP having the number of pulses corresponding to the data X. The counter 3 counts up in response to the command pulse signal CP and supplies the counted value to a digital/analog converter (which will be referred to as the D/A converter, hereinafter) 4. The D/A converter 4 in turn converts the received count value to a D.C. voltage which is applied as a drive voltage to a motor 5. On the other hand, on a shaft of the motor 5 is mounted an incremental encoder 6 for generating a feedback pulse signal fP of a frequency corresponding to the rotation amount of the motor 5. The feedback signal fP is applied as a count-down clock signal to the deviation counter 3, whereby the drive voltage to be applied to the motor 5 is dropped. Therefore, (1) when the command pulse signal CP is higher in frequency than the feedback pulse signal fP, the speed of the motor 5 is accelerated, (2) when the signal CP is equal to the signal fP with respect to frequency, the speed of the motor 5 is kept at a constant level, and (3) the signal CP is lower in frequency than the signal fP, the speed of the motor 5 is decelerated. In this way, the robot positioning operation can be achieved by controlling the value of the data X cyclically applied to the pulse distributor 2 to drive the motor 5 under control of the microcomputer 1.

However, in the case of the prior-art positioning control system of the type referred to above, it is necessary to return the robot to the initial start point (which is called an origin return operation) before power is initially supplied to the system, because the prior art uses the incremental encoder 6 and thus the robot position is detected in the form of a relative position with respect to an origin. More particularly, in the case of the prior art system, the origin return is effected in a software manner by entering an origin detection signal LS from a mechanical limit switch 7 as well as an origin pulse signal BP from the incremental encoder 6, into the microcomputer 1. The origin return operation of the prior art will be detailed by referring to FIG. 2 in which the horizontal (abscissa) line indicates the robot position with respect to time.

When the robot is moving from the left to the right in FIG. 2 at a speed of $V_{max}$, the microcomputer 1 sends the data X of value $\Delta X_{max}$ to the pulse distributor 2 in response to the data request signal DR. If the robot is moved into the vicinity of the origin and the mechanical limit switch 7 provided in a robot passage in the origin vicinity is turned on, then the origin detection signal LS is switched to high logical level, so that the microcomputer 1 sends the data X of value $\Delta X_1$ (whose target robot speed is $V_1$ and $\Delta X_1$ is less than $\Delta X_{max}$) to the pulse distributor 2 in response to the data request signal DR. As a result, the frequency of the command pulse signal CP is decreased and the motor 5 is decelerated. Thereafter, when the robot speed reaches $V_1$, the frequency of the command pulse signal CP becomes equal to that of the feedback pulse signal fP, whereby the robot is moved at a fixed speed from the left to the right in FIG. 2. The microcomputer 1, on the other hand, still monitors the original detection signal LS and the origin pulse signal BP in such a manner, that as soon as the robot has passed the limit switch 7 to change the origin detection signal LS to low logical level, the computer 1 will detect the first pulse or spike in the origin pulse signal BP appearing after the level transition of the signal LS to low level and will send the data X of value 0 (zero) to the pulse distributor 2 in response to the data request signal DR. When the value of the data X goes to zero, the distributor 2 stops the supply of the command pulse signal CP to the deviation counter 3, whereby the counter 3 is counted down by the feedback pulse signal fP. When the counter 3 is counted down to zero, the output voltage of the D/A converter 4 becomes zero and the robot stops.

However, such a prior-art positioning control system has a defect in that the accurate origin return operation can not be effected because a robot coasting distance $L_1$ upon the origin return is long and not constant. Of course, it is possible to reduce the coasting distance $L_1$ and variations in the distance $L_1$ by lowering the robot moving speed $V_1$ itself, but this results in that the time necessary for the robot origin return operation is made long.

SUMMARY OF THE INVENTION

The present invention has been suggested to eliminate the above defect in the prior art.

Accordingly, an object of the present invention is to provide a positioning control system which allows accurate origin return of the robot and also precise positioning control.

Another object of the present invention is to provide a positioning control system which, simultaneously with a generation of the origin pulse signal BP, stops the command pulse signal CP in a hardware manner, whereby variations in the robot coasting distance can be substantially removed.

A further object of the present invention is to provide a positioning control system which, after the robot has been stopped, turns the motor in its backward direction to minimize a difference or deviation between the robot position and the origin.

A still further object of the present invention is to provide a positioning control system which finds a distance during the time period from the beginning of origin return operation to a generation of the first origin pulse in the origin pulse signal after the above first stoppage of the robot is found, and if the found distance is different from the above predetermined coasting distance, which handles this operation as an error.

Yet another object of the present invention is to provide a positioning control system which can easily increase the number of spikes in the output pulse signal issued from the incremental encoder during its one cycle to thereby improve the resolution of the incremental encoder, and which can synchronize the output pulse signal of the encoder with a clock signal of the microcomputer.

Accordingly, the present invention has the following advantages. (1) Since the command pulse signal can be stopped in a hardware manner at the same time when the origin pulse signal generates, there will not occur variations in the robot coasting distance. (2) After the stopping of the command pulse signal, the robot is returned the robot coasting distance. Accordingly, the final or resultant robot coasting distance will be made highly short. (3) Since the final robot coasting distance is determined by the robot returning speed, the precision of the origin return operation will not drop, even if the robot movement speed is made fast. As a result, the total time required for the proper origin return operation can be reduced. (4) Since the invention detects the origin pulse signals twice, error check can be carried out during the origin return operation, whereby reliability in the origin return operation can be enhanced. (5) Since the resolution power of the incremental encoder is improved and the output pulse signal of the encoder is synchronized with the operation clock signal for operation of the microcomputer, much preciser positioning control can be achieved.

The above and other objects and advantages of the present invention will become clear from the following description with reference to the accompanying drawings, in which.

DESCRIPTION OF THE PREFERRED EMBODIMENT

Figure 1:
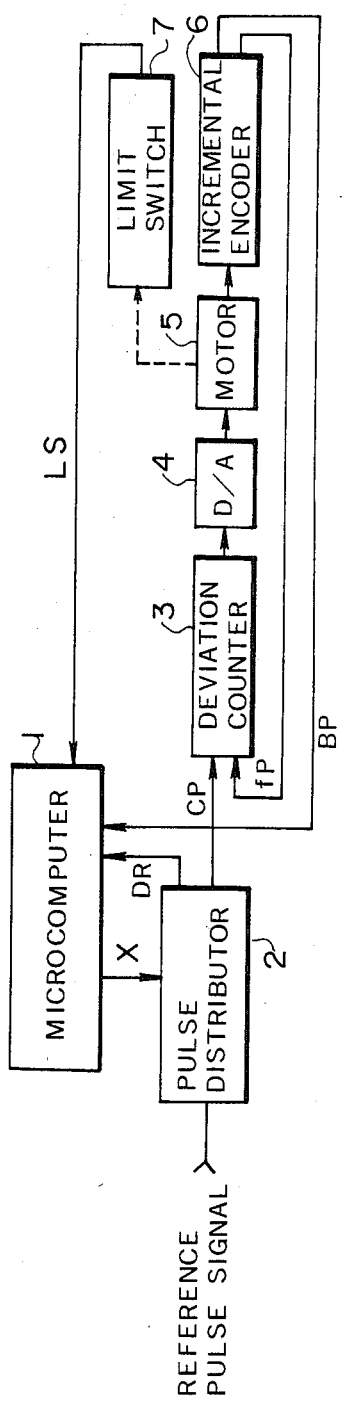
FIG. 1 is a block diagram of a prior-art positioning control system.
Figure 2:
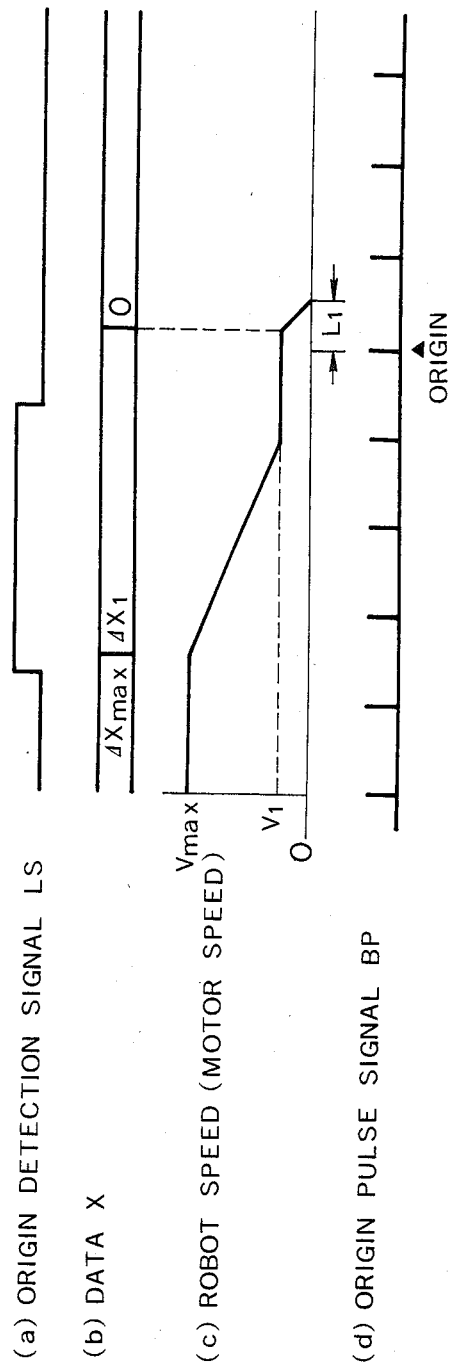
FIG. 2 is a signal timing chart for explaining the origin return operation of the prior art system.

While the present invention will be explained with reference to the preferred embodiment shown in the drawings, it should be understood that the invention is not limited to that embodiment but covers all other possible modifications, alterations, and equivalent arrangements included in the scope of the appended claims.

Figure 3:
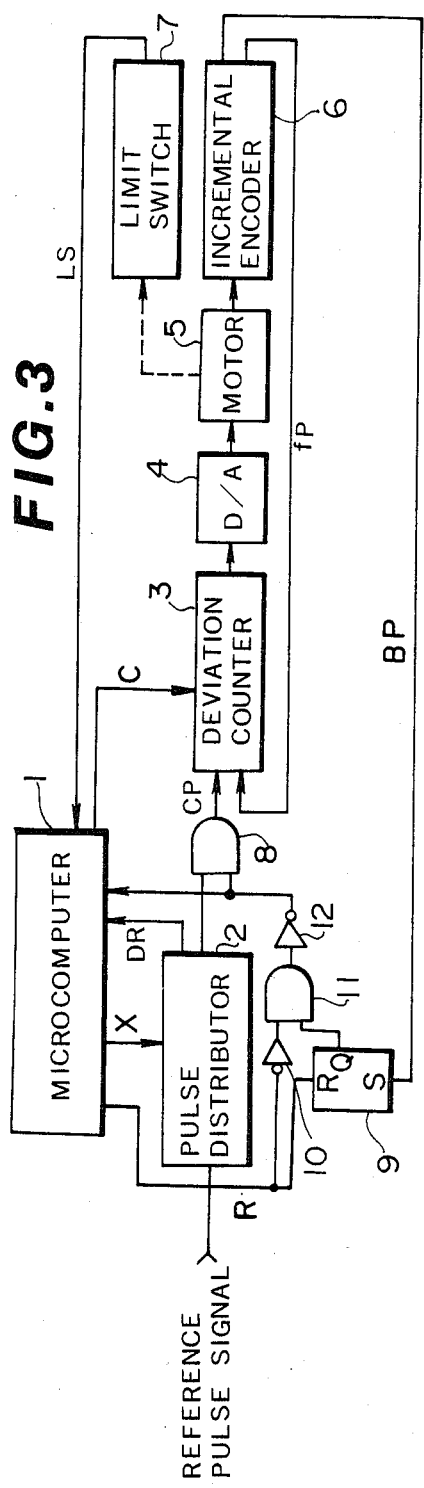
FIG. 3 is a block diagram of a positioning control system in accordance with an embodiment of the present invention.

There is shown a block diagram of an embodiment of the present invention in FIG. 3 in which the same reference numerals or characters as those in FIG. 1 indicate identical or equivalent elements or signals.

In the embodiment of FIG. 3, the command pulse signal CP is applied to the deviation counter 3 via an AND gate 8 which in turn is controllably opened or closed according to the status of a flip-flop 9. More particularly, after being initialized by the microcomputer 1, the flip-flop 9 is set by the first spike in the origin pulse signal BP appearing after the origin detection signal LS becomes low level, whereby the AND gate 8 will be closed to stop the command pulse signal CP from being supplied to the counter 3 in a hardware manner.

Figure 4:
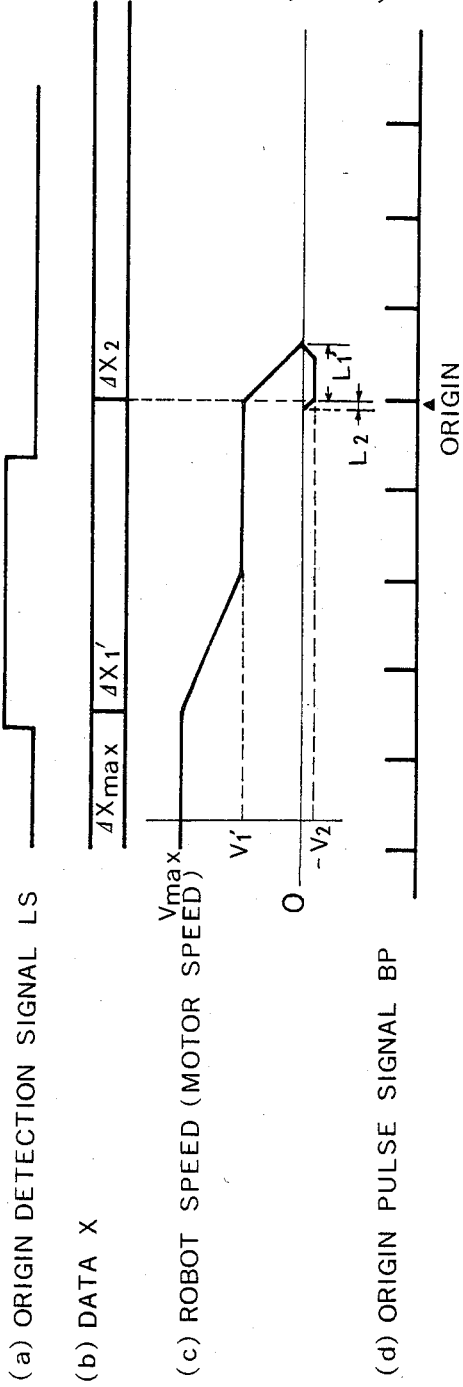
FIG. 4 is a signal timing chart for explaining the origin return operation of the system of FIG. 3.
Figure 5:
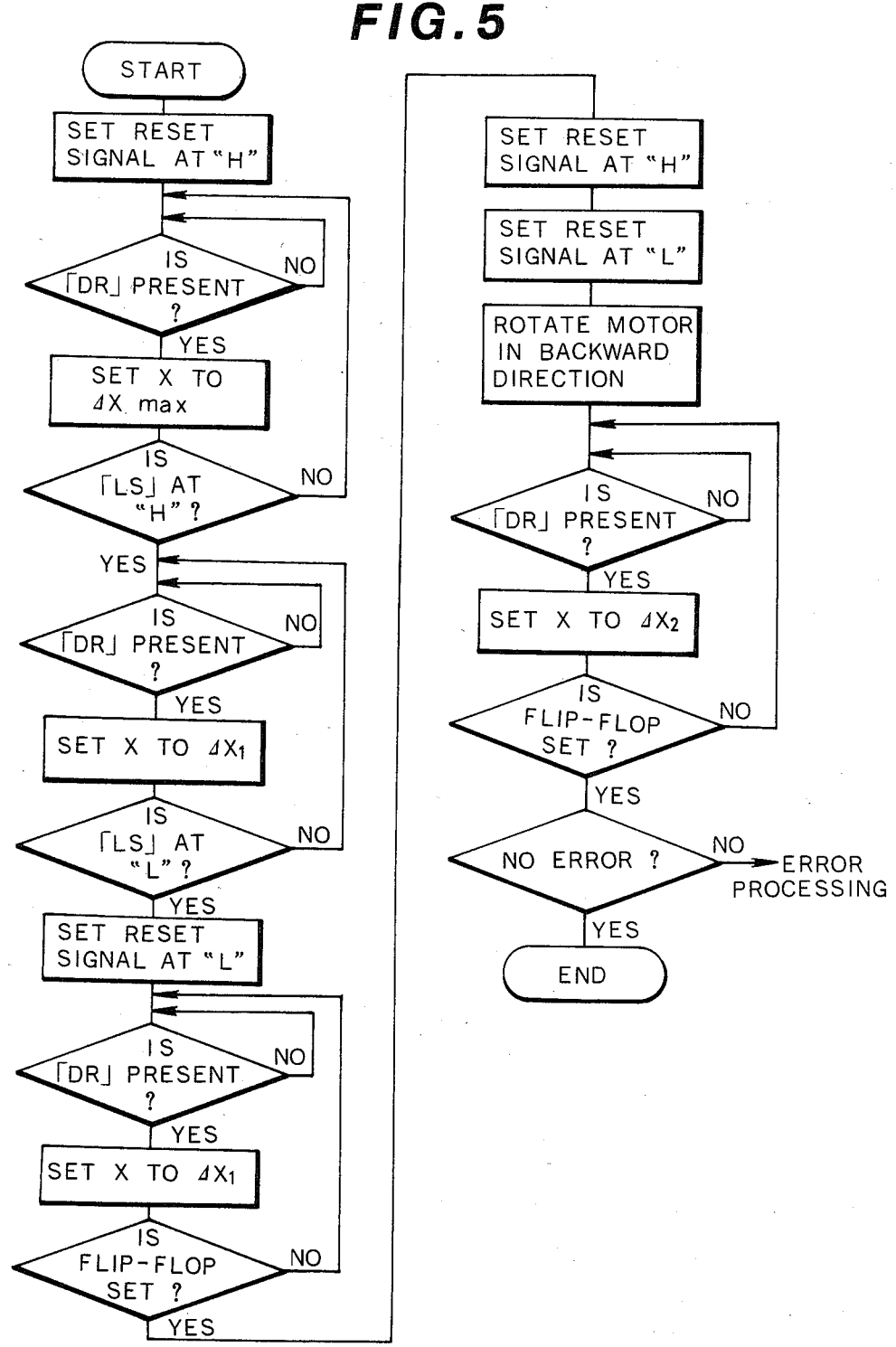
FIG. 5 is a flowchart for explanation of the origin return operation by the system of FIG. 3.

Next, the origin return operation of the embodiment of FIG. 3 will be detailed by referring to FIGS. 4 and 5. FIG. 4 is an explanatory view showing the robot position and associated control signals, and FIG. 5 is a flowchart for control of the microcomputer 1.

First of all, the microcomputer 1 is preprogrammed so that a reset signal R has a high logical level. Therefore, the flip-flop 9 will be reset to generate a low level signal at its terminal Q. This will result in that an AND gate 11 generates a low level signal and correspondingly an inverter 12 generates a high level signal, whereby the AND gate 8 will be opened. In other words, the AND gate 8 is ready to supply the command pulse signal CP from the pulse distributor 2 to the deviation counter 3.

On the other hand, the microcomputer 1 monitors the data request signal DR entered from the pulse distributor 2, so as to supply to the distributor 2 the data X indicative of a robot movement amount each time the computer 1 receives the signal DR. At this point, the data X is set to have a value of $\Delta X_{max}$. More particularly, the computer 1 is designed to set a value of $\Delta X_{max}$ in an internal output register (not shown) within the computer, and supply the content in the internal register to the pulse distributor 2 each time the computer receives the data request signal DR.

So long as the data X supplied to the distributor 2 has a value of $\Delta X_{max}$, the frequency of the command pulse signal CP applied to the deviation counter 3 from the distributor 2 will be equal to that of the feedback pulse signal fP to the counter 3 from the incremental encoder 6, and thus a fixed drive voltage is applied from the D/A converter 4 to the motor 5. As a result, so long as the data X supplied to the distributor 2 has a value of $\Delta X_{max}$, the robot will be moved at a constant speed of $V_{max}$ from the left to the right in FIG. 4.

When the robot is moved into the vicinity of the origin and the mechanical limit switch provided in the robot passage is turned on, the origin detection signal LS will be switched to high level.

The microcomputer 1 monitors the origin detection signal LS and, as soon as the signal LS goes to high level, the computer 1 will reduce the robot movement speed. That is, after the signal LS has been changed to high level, the computer 1 will send the data X of value $\Delta X_1'$ (whose robot target speed is $V_1'$ and $\Delta X_1'$ is smaller than $\Delta X_{max}$) to the pulse distributor 2.

When the data X has a value of $\Delta X_1'$, the frequency of the command pulse signal CP will be decreased and the deviation counter 3 will be counted down by the feedback pulse signal fP. As a result, the drive voltage to be supplied from the converter 4 to the motor 5 will be reduced and correspondingly the robot movement speed will be decreased. When the robot movement speed drops to $V_1'$, the command pulse signal CP will become equal to the feedback pulse signal fP with respect to frequency and subsequently the robot will move at a fixed speed of $V_1'$ from the left to the right in FIG. 4.

After the robot has been passed the limit switch 7, the switch 7 will be turned off because the switch is not depressed any longer by the robot, whereby the origin detection signal LS is changed to low level.

In response to the transition of the signal LS to low level, the computer 1 will cause the reset signal R to have low level. When the signal R is switched to low level, the flip-flop 9 will be ready to respond to the origin pulse signal. Thereafter, the flip-flop 9 will be set by the first origin pulse signal BP appearing after the reset signal R goes to low level. Setting the flip-flop 9 will cause the inverter 12 to produce a low level signal, whereby the AND gate 8 will be closed. That is, as soon as the origin pulse signal BP generates, the AND gate 8 will be closed to stop the command pulse signal CP from being supplied to the deviation counter 3. Accordingly, simultaneously with a generation of the origin pulse signal BP, the deviation counter 3 will be counted down by the feedback pulse signal fP. When the count value of the counter 3 reaches zero, the drive voltage of zero volts will be applied from the D/A converter to the motor 5, whereby the robot will be stopped.

As mentioned above, according to the embodiment of the present invention, the command pulse signal CP will be stopped in a hardware manner at the same time when the first spike in the origin pulse signal BP appears after the origin detection signal LS goes negative or falls, whereby the robot coasting distance $L_1'$ can be kept constant at all time.

Therefore, in the case where it is possible to allow for such a constant robot coasting distance $L_1'$ in actual positioning control applications, satisfactory precision for the positioning control can be obtained with use of the technical arrangement described above.

On the other hand, the output of the inverter 12 is also applied to the microcomputer 1 so that, when the inverter output is switched to low level, the microcomputer 1 will judge that the robot has passed the origin.

As soon as judging the robot passage over the origin, the microcomputer 1 will get ready to cause the robot to be returned to the origin in the following manner.

First, the microcomputer 1 will cause the reset signal R to be switched to high level and subsequently immediately switched to low level. That is, when the reset signal R is changed to high level, the flip-flop 9 will be reset so that the Q terminal wil be low and the AND gate 11 closed (i.e., the AND gate 11 will produce a low output). Therefore, the inverter 12 generates a high level signal and the AND gate 8 opens. Note that, when the reset signal R is changed to low level, the flip-flop 9 will be set to get ready to respond to the origin pulse signal BP.

On the other hand, the motor 5 can be driven in the backward direction by any method in which the output voltage of the D/A converter 4 is finally inverted with respect to polarity. In the illustrated embodiment the sign (polarity) of the command pulse signal CP entered into the counter 3 can be inverted by feeding a control signal C from the microcomputer 1 to the deviation counter 3.

After preparations for motor backward rotation has been finished, the microcomputer 1 will monitor the data request signal DR in such a manner as to supply the data X to the pulse distributor 2 each time the computer 1 receives the signal DR. At this time, the data X is set to have a value of $\Delta X_2$ so that the distributor 2 will issue the command pulse signal CP of a frequency corresponding to the value $\Delta X_2$ of the data X. In this connection, the frequency of the signal CP is substantially much smaller than that when the data X has a value of $\Delta X_1'$.

The command pulse signal CP causes the absolute value of the count content in the deviation counter 3 to count up or increment, but the sign of the count content is negative. Accordingly, the output voltage of the D/A converter 4 will be also negative and the motor 5 will rotate in the backward direction. As a result, the robot will start to move from the right to left in FIG. 4, and when the robot movement speed reaches a speed of ($-V_2$), the frequency of the command pulse signal CP will become equal to that of the feedback pulse signal fP, whereby the robot will start to move at a fixed speed.

When the robot is returned the distance $L_1'$ from the right to the left in FIG. 4, the incremental encoder 6 will generate the origin pulse signal BP by which flip-flop 9 will be set. This results in that the inverter 12 generates a low level signal and the AND gate 8 closes. In other words, as soon as the origin pulse signal BP generates, the AND gate 8 will be closed to stop the supply of the command pulse signal CP to the deviation counter 3. Therefore, simultaneously with a generation of the signal BP, the absolute value of the count content in the deviation counter 3 will be counted down or decremented by the feedback pulse signal fP. In this way, when the count value of the counter 3 reaches zero, the D/A converter 4 will generate no output voltage and the robot will stop.

The robot coasting distance shifted during the time from a generation of the origin pulse signal BP to the stopping of the robot is illustrated by a character $L_2$ in FIG. 4.

More specifically, with the illustrated embodiment, the robot is returned at a very low speed of $V_2$ from the right to the left after passing the origin from the left to the right, and therefore the robot coasting distance $L_2$ will be made very short.

After the foregoing origin return operation has been completed, the reset signal R will be changed again to high level under control of the microcomputer 1 so that the inverter 10 generates a low level signal and the AND gate 11 closes. Accordingly, even if the status of the flip-flop 9 is varied by the origin pulse signal BP, the AND gate 8 will be opened to always allow the supply of the command pulse signal CP from the pulse distributor 2 to the deviation counter 3.

When it is desired to further increase the reliability in the origin return operation, such an error check as shown in the following can be carried out.

The microcomputer 1 will monitor the varying status of the flip-flop 9 in such a manner as to perform the error check when detecting that the flip-flop 9 has been set.

In accordance with the present invention, the first robot coasting distance $L_1'$ will be kept constant. Accordingly, when the robot is returned the distance $L_1'$ from the right to the left in FIG. 4, the incremental encoder 6 is to generate the origin pulse signal BP. However, if the first spike in the origin pulse signal actually consists of noise, for example, then the encoder 6 might not generate the origin pulse signal even though the robot is returned the distance $L_1'$ from the right to the left.

For this reason, the microcomputer 1 will find a distance for the robot to actually move during the time from the starting to return from the right to the left in FIG. 4 to a generation of the origin pulse signal, and if the actual distance is different from the predetermined robot coasting distance $L_1'$ will carry out a proper error processing.

Although the microcomputer 1 has been arranged to sequentially monitor the origin detection signal LS, data request signal DR, status of the flip-flop 9 and so on in the above embodiment, other processing procedures including interrupt processing may be employed depending upon the processing capability of the microcomputer 1 and the type of the executing operations. Further, the above explanation has been directed to the case where the robot is returned from the right to the left by inverting the sign of the input signal to the deviation counter, but it goes without saying that the robot returning (backward) control may be effected by a method most suitable for the practical control system.

Figure 6:
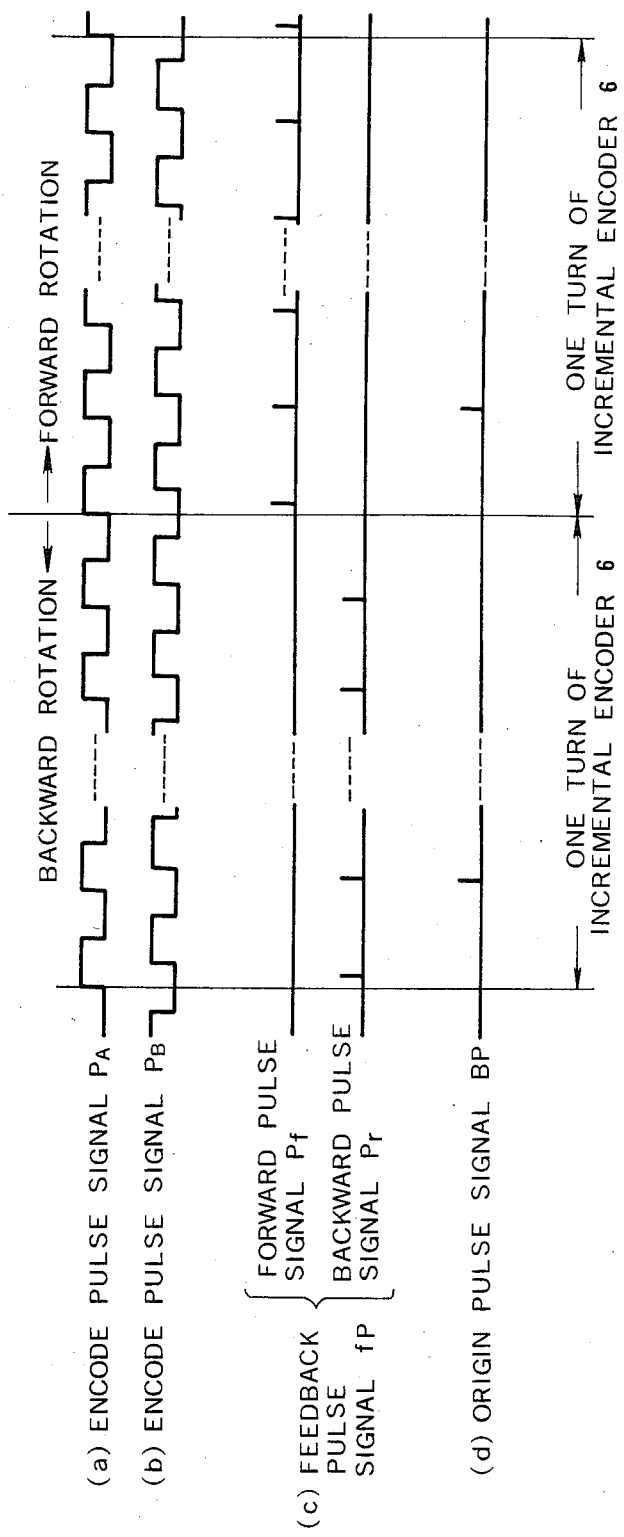
FIG. 6 is a timing chart for explaining the operation of an incremental encoder shown in FIG. 3.

The feedback pulse signal fP and the origin pulse signal BP are issued from an option circuit (not shown) contained in the incremental encoder 6. More specifically, the option circuit produces the signals fP and BP on the basis of two types of encode pulse signals $P_A$ and $P_B$ (whose phases are shifted 90 degrees to each other) from an encoder portion contained also in the encoder 6. The relation between the two types of encode pulse signals, the feedback pulse signal, and the origin pulse signal are illustrated in FIG. 6.

That is, when the shaft rotation of the incremental encoder 6 (that is, motor 5) is switched from the forward mode to the backward mode or vice versa, the phase relation between the encode pulse signals $P_A$ and $P_B$ will be reversed so that when the encoder shaft rotates in the forward direction the signal $P_A$ will advance or lead the signal $P_B$ by a phase difference of 90 degrees, while when the shaft rotates in the backward direction the signal $P_B$ will advance or lead the signal $P_A$ by a phase difference of 90 degrees. When the encoder shaft is in the forward mode, the option circuit will generate a forward pulse signal $P_f$, and when the shaft is in the backward mode, the option circuit will generate a backward pulse signal $P_r$, on the basis of the encode signals $P_A$ and $P_B$ (refer to FIG. 6, (c)), while the option circuit will also generate the origin pulse signal BP each time the incremental encoder 6 rotates one turn (refer to FIG. 6, (d)).

However, a prior art option circuit of the type referred to above is complicated in arrangement and requires a lot of parts or elements. Further, the prior-art option circuit has such defects that in the case where a plurality of feedback pulses or spikes fP (that is, the forward pulse signal $P_f$ or the backward pulse signal $P_r$) are provided during each one cycle period of the encode pulse signals $P_A$ and $P_B$ in order to increase the resolution power of the incremental encoder 6, a lot of additional circuit elements are necessary and its arrangement is made much complicated.

Figure 7:
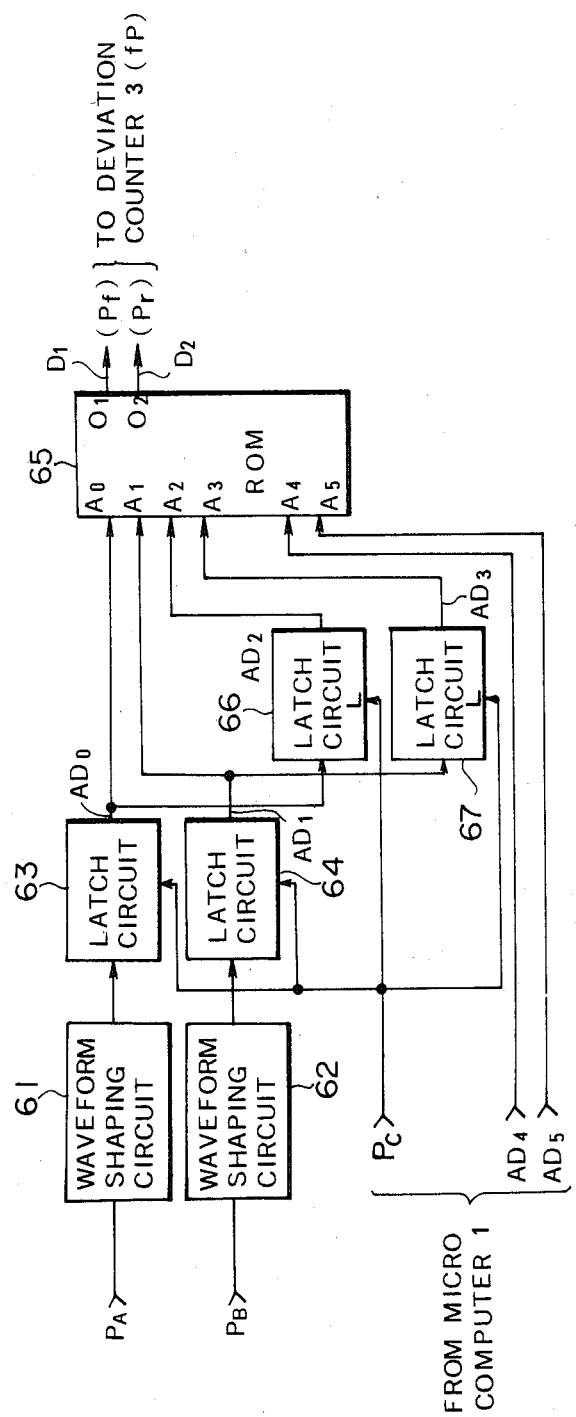
FIG. 7 is an exemplary block diagram of a part of the incremental encoder used in the positioning control system of the invention.

FIG. 7 shows an option circuit in the incremental encoder 6 which facilitates improvement of resolution power of the encoder 6 and synchronization of the feedback pulse signal fP with the clock signal of the microcomputer 1. In the circuit of FIG. 7, such encode pulse signals $P_A$ and $P_B$ from the incremental encoder 6 as illustrated in FIG. 6, (a) and (b) are applied through waveform shaping circuits 61 and 62 to latch circuits 63 and 64, respectively. When a clock signal $P_c$ (which is also used as the clock signal for operation of the microcomputer 1) applied to respective latch input terminals L of the latch circuits goes positive or rises, the latch circuits 63 and 64 will latch the encode pulse signals $P_A$ and $P_B$ and supply their output signals $AD_0$ and $AD_1$ to address input terminals $A_0$ and $A_1$ of a read-only memory (ROM) 65 (which will be described later) and also to other latch circuits 66 and 67. When the clock signal $P_c$ applied to their latch input terminals L goes positive or rises, the latch circuits 66 and 67 will latch the signals $AD_0$ and $AD_1$ and send their output signals $AD_2$ and $AD_3$ to input terminals $A_2$ and $A_3$ of the ROM 65. On the other hand, the ROM 65 also receives at its address input terminals $A_4$ and $A_5$ address data $AD_4$ and $AD_5$ from the microcomputer 1 (refer to FIG. 3), the data $AD_4$ and $AD_5$ being used to set the number of spikes in the forward and backward pulse signals $P_f$ and $P_r$ which appear during each one cycle period T of the encode pulse signals $P_A$ and $P_B$.

The ROM 65 stores therein data $D_1$ and $D_2$ listed in the following table, selects data $D_1$ and $D_2$ according to the data $AD_0$ to $AD_5$ applied to the address input terminals $A_0$ to $A_5$ on the ROM, and provides them to data output terminals $O_1$ and $O_2$ on the ROM.

TABLE 1

| | | $A_5$ ($AD_5$ | $A_4$ $AD_4$) | $A_3$ ($AD_3$ | $A_2$ $AD_2$ | $A_1$ $AD_1$ | $A_0$ $AD_0$) | $O_2$ ($D_2$ | $O_1$ $D_1$) | |
|---|---|---|---|---|---|---|---|---|---|---|
| A | | 0 | 0 | 0 | 0 | 0 | 0 | 1 | 1 | |
| | | 0 | 0 | 0 | 0 | 0 | 1 | 1 | 0 | F |
| | | 0 | 0 | 0 | 0 | 1 | 0 | 1 | 1 | |
| | | 0 | 0 | 0 | 0 | 1 | 1 | 1 | 1 | |
| | | 0 | 0 | 0 | 1 | 0 | 0 | 0 | 1 | B |
| | | 0 | 0 | 0 | 1 | 0 | 1 | 1 | 1 | |
| | | 0 | 0 | 0 | 1 | 1 | 0 | 1 | 1 | |
| | | 0 | 0 | 0 | 1 | 1 | 1 | 1 | 1 | |
| | | 0 | 0 | 1 | 0 | 0 | 0 | 1 | 1 | |
| | | 0 | 0 | 1 | 0 | 0 | 1 | 1 | 1 | |
| | | 0 | 0 | 1 | 0 | 1 | 0 | 1 | 1 | |
| | | 0 | 0 | 1 | 0 | 1 | 1 | 1 | 1 | |
| | | 0 | 0 | 1 | 1 | 0 | 0 | 1 | 1 | |
| | | 0 | 0 | 1 | 1 | 0 | 1 | 1 | 1 | |
| | | 0 | 0 | 1 | 1 | 1 | 0 | 1 | 1 | |
| | | 0 | 0 | 1 | 1 | 1 | 1 | 1 | 1 | |
| B | | 0 | 1 | 0 | 0 | 0 | 0 | 1 | 1 | |
| | | 0 | 1 | 0 | 0 | 0 | 1 | 1 | 0 | F |
| | | 0 | 1 | 0 | 0 | 1 | 0 | 1 | 1 | |
| | | 0 | 1 | 0 | 0 | 1 | 1 | 1 | 1 | |
| | | 0 | 1 | 0 | 1 | 0 | 0 | 0 | 1 | B |
| | | 0 | 1 | 0 | 1 | 0 | 1 | 1 | 1 | |
| | | 0 | 1 | 0 | 1 | 1 | 0 | 1 | 1 | |
| | | 0 | 1 | 0 | 1 | 1 | 1 | 1 | 1 | |
| | | 0 | 1 | 1 | 0 | 0 | 0 | 1 | 1 | |
| | | 0 | 1 | 1 | 0 | 0 | 1 | 1 | 1 | |
| | | 0 | 1 | 1 | 0 | 1 | 0 | 1 | 1 | |
| | | 0 | 1 | 1 | 0 | 1 | 1 | 0 | 1 | B |
| | | 0 | 1 | 1 | 1 | 0 | 0 | 1 | 1 | |
| | | 0 | 1 | 1 | 1 | 0 | 1 | 1 | 1 | |
| | | 0 | 1 | 1 | 1 | 1 | 0 | 1 | 0 | F |
| | | 0 | 1 | 1 | 1 | 1 | 1 | 1 | 1 | |
| C | | 1 | 0 | 0 | 0 | 0 | 0 | 1 | 1 | |
| | | 1 | 0 | 0 | 0 | 0 | 1 | 1 | 0 | F |
| | | 1 | 0 | 0 | 0 | 1 | 0 | 1 | 1 | |
| | | 1 | 0 | 0 | 0 | 1 | 1 | 1 | 1 | |
| | | 1 | 0 | 0 | 1 | 0 | 0 | 0 | 1 | B |
| | | 1 | 0 | 0 | 1 | 0 | 1 | 1 | 1 | |
| | | 1 | 0 | 0 | 1 | 1 | 0 | 1 | 1 | |
| | | 1 | 0 | 0 | 1 | 1 | 1 | 1 | 0 | F |
| | | 1 | 0 | 1 | 0 | 0 | 0 | 1 | 1 | |
| | | 1 | 0 | 1 | 0 | 0 | 1 | 1 | 1 | |
| | | 1 | 0 | 1 | 0 | 1 | 0 | 1 | 1 | |
| | | 1 | 0 | 1 | 0 | 1 | 1 | 0 | 1 | B |
| | | 1 | 0 | 1 | 1 | 0 | 0 | 1 | 1 | |
| | | 1 | 0 | 1 | 1 | 0 | 1 | 0 | 1 | B |
| | | 1 | 0 | 1 | 1 | 1 | 0 | 1 | 0 | F |
| | | 1 | 0 | 1 | 1 | 1 | 1 | 1 | 1 | |
| | | 1 | 1 | 0 | 0 | 0 | 0 | 1 | 1 | |
| | | 1 | 1 | 0 | 0 | 0 | 1 | 1 | 0 | F |
| | | 1 | 1 | 0 | 0 | 1 | 0 | 0 | 1 | B |
| | | 1 | 1 | 0 | 0 | 1 | 1 | 1 | 1 | |
| | | 1 | 1 | 0 | 1 | 0 | 0 | 0 | 1 | B |

TABLE 1-continued

| | A5 (AD5) | A4 (AD4) | A3 (AD3) | A2 (AD2) | A1 (AD1) | A0 (AD0) | O2 (D2) | O1 (D1) | |
|---|---|---|---|---|---|---|---|---|---|
| | 1 | 1 | 0 | 1 | 0 | 1 | 1 | 1 | |
| | 1 | 1 | 0 | 1 | 1 | 0 | 1 | 1 | |
| | 1 | 1 | 0 | 1 | 1 | 1 | 1 | 0 | F |
| D | 1 | 1 | 1 | 0 | 0 | 0 | 1 | 0 | F |
| | 1 | 1 | 1 | 0 | 0 | 1 | 1 | 1 | |
| | 1 | 1 | 1 | 0 | 1 | 0 | 1 | 1 | |
| | 1 | 1 | 1 | 0 | 1 | 1 | 0 | 1 | B |
| | 1 | 1 | 1 | 1 | 0 | 0 | 1 | 1 | |
| | 1 | 1 | 1 | 1 | 0 | 1 | 0 | 1 | |
| | 1 | 1 | 1 | 1 | 1 | 0 | 1 | 0 | B |
| | 1 | 1 | 1 | 1 | 1 | 1 | 1 | 1 | F |

F: Forward
B: Backward

In this way, the circuit shown in FIG. 7 can produce the forward or backward pulse signal $P_f$ or $P_r$ (the output data $D_1$ or $D_2$ from the ROM 65) which is synchronized with the clock signal $P_c$ and whose spikes appear four in maximum number during each one cycle period T of the encode pulse signals $P_A$ and $P_B$ in the incremental encoder 6. The operation of the circuit of FIG. 7 will be explained in the following by referring to FIG. 8 showing a timing chart in the case where the incremental encoder 6 rotates in the forward direction.

If the address data $AD_4$ and $AD_5$ are set to have respectively a logical value "0" in order to provide one spike or pulse in the forward pulse signal $P_f$ during the each one period T, then any one of 16 ($D_1$, $D_2$) pairs given in zone A in the above table is selected in response to changes in the above 4 address data $AD_0$ to $AD_3$ and in accordance with the generation period of the clock signal $P_c$.

Figure 8:
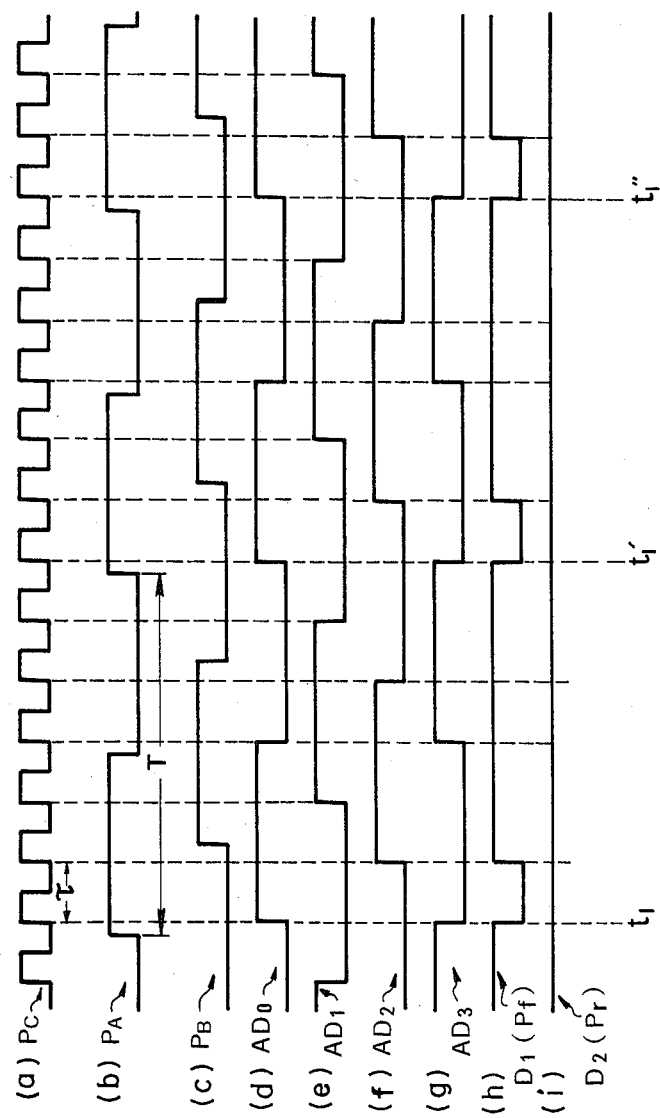
FIGS. 8 and 9 are timing charts for explanation of exemplary operations of the incremental encoder part of FIG. 7.

Since the address data $AD_0$ to $AD_3$ in the forward rotation mode of the incremental encoder 6 have such a phase relation as shown in FIG. 8, (d) to (g), the forward data $D_1$ will be changed to logical value "0" (corresponding to "forward" in the zone A in the table) only when the address data $AD_0$, $AD_1$, $AD_2$, and $AD_3$ have respectively logical levels "1", "0", "0", and "0", that is, only at times $t_1$, $t_1'$ and $t_1''$ in FIG. 8. The "0" state of the forward data $D_1$ will be maintained until the next clock signal $P_c$ appears and the address data $AD_2$ is switched to logical level "1". As a result, the ROM 65 will generate at its forward output terminal $O_1$ such a negative pulse signal $P_f$ as given in FIG. 8, (h) and as synchronized with the clock signal $P_c$.

If the address data $AD_0$, $AD_1$, $AD_2$ and $AD_3$ in the zone A of the table are changed respectively to logical levels "0", "0", "1" and "0", then the data $D_2$ stored in the ROM 65 will be switched to logical value "0", but the data $AD_0$, $AD_1$, $AD_2$ and $AD_3$ will not be changed respectively to "0", "0", "1" and "0" in such a phase relation of the encode pulse signals $P_A$ and $P_B$ as shown in FIG. 8. As a result, the output data $D_2$ at the backward output terminal $O_2$ of the ROM 65 will be kept at level "1" without any change as shown in FIG. 8, (i).

Figure 9:
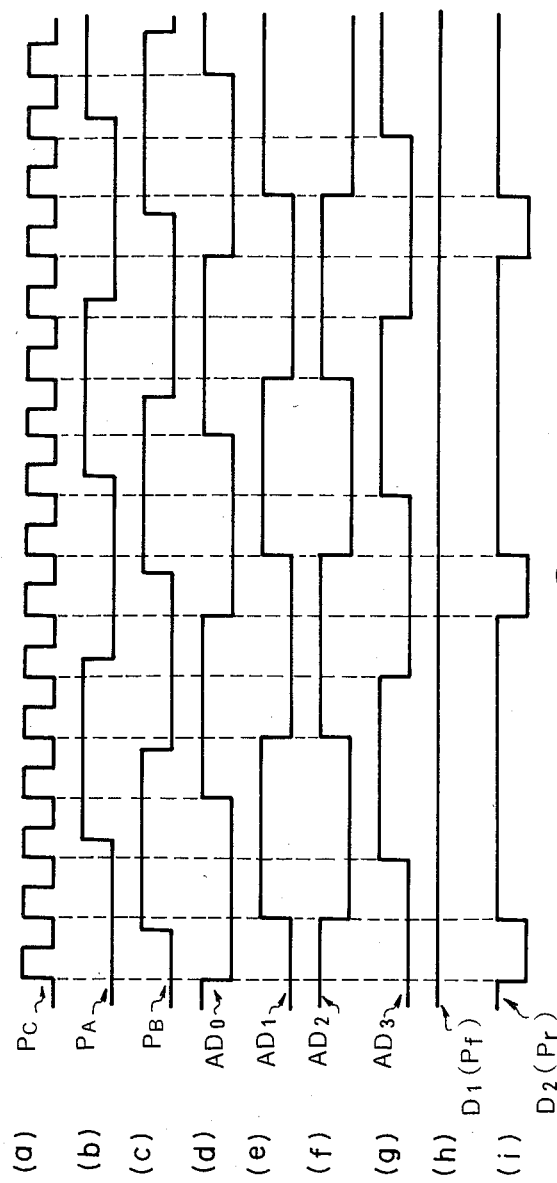

On the other hand, when the encoder rotates in the backward direction, the circuit of FIG. 7 will operate in such a timing relation as shown in FIG. 9. Therefore, only when the address data $AD_0$, $AD_1$, $AD_2$ and $AD_3$ is changed respectively to logical levels "0", "0", "1" and "0" (corresponding to "backward" in the zone A of the table), the output data $D_2$ at the backward output terminal $O_2$ of the ROM 65 will have a logical level "0". Accordingly, the ROM 65 will generate one negative pulse or spike of the signal $P_r$ during the each one cycle period T in synchronism with the clock signal $P_c$, as illustrated in FIG. 9, (i). Of course, the address data $AD_0$, $AD_1$, $AD_2$ and $AD_3$ will not have "1", "0", "0" and "0" in this backward mode, and thus as given in FIG. 9, (h), the output data $D_1$ at the forward output terminal $O_1$ of the ROM 65 will be kept at a logical level "1".

As a result, when the address data $AD_4$ and $AD_5$ have respectively levels "0" and "0" and the incremental encoder 6 rotates in the forward or backward direction, the ROM 65 will generate one spike of the encode pulse signal $P_f$ or $P_r$ during the each one cycle T of the encode pulse signals $P_A$ and $P_B$.

The circuit shown in FIG. 7, further, can generate 2 to 4 spikes of the feedback pulse signal fP (forward pulse signal $P_f$ or backward pulse signal $P_f$) during the each one cycle T of the encode pulse signals $P_A$ and $P_B$, by changing the address data $AD_4$ and $AD_5$ entered from the microcomputer 1. For example, when the address data $AD_4$ and $AD_5$ are set to have respectively levels "0" and "1" as given in zone B of the table, the circuit of FIG. 7 will generate each two spikes of the forward and backward pulse signals $P_f$ and $P_r$ in the forward and backward mode of the incremental encoder 6 during the above each one cycle T, as indicated with "forward" and "backward" in the table. And, if the address data $AD_4$ and $AD_5$ are set to have respectively logical levels "1" and "0", and "1" and "1" as given in zones C and D of the table, the ROM 65 will generate 3 or 4 spikes of the forward or backward pulse signal $P_f$ or $P_r$ during the above each one cycle T in synchronism with the clock signal $P_c$.

Figure 10:
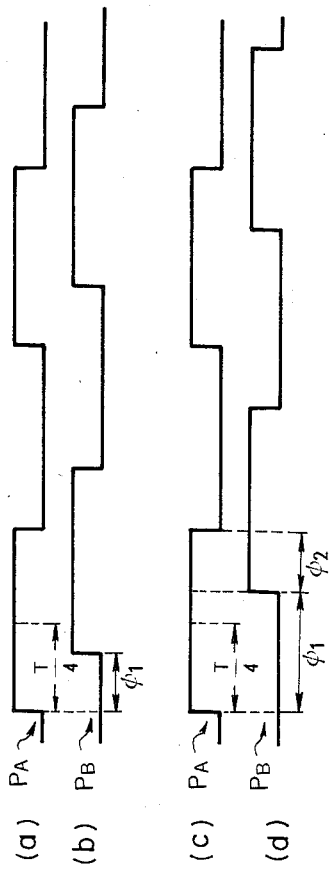
FIG. 10 shows other waveforms of signals available for the incremental encoder of FIG. 7.

In the above example, explanation has been made about the case where the phase difference between the encode pulse signals $P_A$ and $P_B$ is ¼ one period of the each signal $P_A$ or $P_B$ (that is T/4), but it will be appreciated that the present invention is not limited to the above period. For example, the invention can be similarly applied in the case where the phase difference $O_1$ between the encode pulse signals $P_A$ and $P_B$ is smaller than ¼ the one period of the each signals $P_A$ or $P_B$ (that is, T/4) as illustrated in FIG. 10, (a) and (b), and in the case where the phase difference $O_1$ is larger than T/4. In the former case, the clock signal $P_c$ must have a period smaller than the phase difference $O_1$; whereas, in the latter case, the clock signal must have a period smaller than the duration $O_2$ (see FIG. 10, (d)) from the positive-going edge of the encode pulse signal $P_B$ to the negative-going edge of the encode pulse signal $P_A$.

As has been described in the foregoing, when the circuit shown in FIG. 7 is used as an option circuit in the incremental encoder 6, a plurality of (up to 4) spikes in the feedback pulse signal fP (forward pulse signal $P_f$ or backward pulse signal $P_r$) can be easily provided during the each one cycle of the encode pulse signals, whereby the resolution power of the incremental encoder 6 can be easily increased. This allows the use of the preciser command pulse signal CP, whereby the control precision of the positioning control system itself can be also improved remarkably. In addition, since the feedback pulse signal fP can be completely synchronized with the clock signal $P_c$ for operation of the microcomputer 1, the positioning precision can be additionally increased.

What is claimed is:
1. For use in a positioning control system having an incremental encoder mounted on a rotary shaft of a motor for generating a feedback pulse signal in accordance with the rotational speed of said motor, the improvement wherein said incremental encoder has an option circuit which comprises first latch means for separately latching two encode pulse signals according to a clock signal, said two encode signals being shifted to each other with respect to phase so that the phase relation between the encode signals is reversed when the rotation direction of said motor reverses, said clock signal having a period smaller than a shorter one out of a time corresponding to said phase difference and a time required from a positive-going edge of one of said two encode pulse signals which lags the other to a negative going edge of the other which advances the one; second latch means for latching an output signal of said first latch means according to said clock signal; and memory means beforehand stored therein with forward and backward data and for receiving output signals of said first and second latch means as address data and for generating said forward data as said feedback pulse signal when four signals forming said address data have a phase relation indicative of forward rotation of said incremental encoder and for generating said backward data as said feedback pulse signal when said four signals have a relation indicative of reverse rotation of the encoder.

2. The improvement for a positioning control system as set forth in claim 1, further including means for generating an additional address data to be added to said address data, thus reading out a particular data from among the data stored in said memory means.

3. An option circuit for an incremental encoder being capable of indicating forward or reverse rotation of the encoder, comprising:

first latch means, actuated by a clock signal, for separately latching two encode pulse signals, said two encode pulse signals being 90 degrees out of phase and wherein the 90 degree out of phase relation between the encode signals is reversed when the rotation direction of the encoder reverses, and wherein the clock signal has a period smaller than that of the encode pulses, the clock signal period being equal to the time which lapses from when a particular positive-going edge of one of said encode pulses passes a given point to the time when the nearest positive-going edge of the other of said encode pulses passes the same point;

second latch means, actuated by said clock signal, for latching an output signal of said first latch means;

memory means for receiving output signals of said first and second latch means as address data and for generating a forward data signal when the address data indicates forward rotation of the incremental encoder and for generating a backward data signal when the address data indicates reverse rotation of the incremental encoder.

4. The option circuit of claim 3 further including means for generating additional address data to be received by said memory means, said memory means having data stored therein, and thereby reading out a particular data from among the data stored in said memory means.

5. In a position control system having a motor for driving an object to be transferred and an incremental encoder mounted to a rotary shaft of said motor, said incremental encoder detecting relative position of the object with respect to an origin position, wherein the rotational speed of said motor is determined based on difference in the number of pulses between a command pulse signal, wherein the number of pulses per unit time period corresponds to a transfer rate of said object and a feedback pulse signal supplied from said incremental encoder, wherein the number of pulses per unit time period corresponds to the actual rotational rate of said motor, the frequency of said command pulse signal being controlled by programs to determine said transfer rate of said object, and wherein the stop position of said object is determined based on an origin pulse signal supplied from said incremental encoder, the improvement comprising:

means for generating an origin detection signal when said object nears a certain transfer destination position, a logic circuit for causing said frequency of the command pulse signal to be reduced when said origin pulse signal next is supplied after generation of said origin detection signal; and rotation reversing means, cooperating with said logic circuit, for driving said motor in the reverse rotation direction with said command pulse signal of reduced frequency, and wherein said logic circuit thereafter causes said command pulse signal to terminate when the origin pulse signal is again generated, said system further comprising;

means for comparing a value corresponding to the amount of rotation that said motor is expected to be rotated during a period from said initially supplied origin pulse signal to the stop of said motor with a value showing the amount of rotation that said motor has rotated during a period from the instant that the motor rotation is reversed to the time when said origin pulse signal again is generated, whereby an appropriate error compensation measure is taken when said two total numbers of rotation do not coincide with each other.

* * * * *